US011938473B2

(12) United States Patent
Esfehanian et al.

(10) Patent No.: US 11,938,473 B2
(45) Date of Patent: Mar. 26, 2024

(54) DEVICE AND METHOD FOR THERMAL OR THERMO-CHEMICAL TREATMENT OF MATERIAL

(71) Applicant: ONEJOON GMBH, Bovenden (DE)

(72) Inventors: Arian Esfehanian, Böblingen (DE); Peter Vervoort, Uslar-Volpriehausen (DE); Michael Neubauer, Holzgerlingen (DE)

(73) Assignee: ONEJOON GMBH, Bovenden (DE)

( * ) Notice: Subject to any disclaimer, the term of this patent is extended or adjusted under 35 U.S.C. 154(b) by 0 days.

(21) Appl. No.: 16/646,940

(22) PCT Filed: Nov. 14, 2017

(86) PCT No.: PCT/EP2017/079140
§ 371 (c)(1),
(2) Date: Aug. 8, 2022

(87) PCT Pub. No.: WO2019/052674
PCT Pub. Date: Mar. 21, 2019

(65) Prior Publication Data
US 2020/0269205 A1     Aug. 27, 2020

(30) Foreign Application Priority Data

Sep. 13, 2017   (DE) .................. 10 2017 121 224

(51) Int. Cl.
*B01J 6/00*   (2006.01)
*B01J 4/00*   (2006.01)
(Continued)

(52) U.S. Cl.
CPC .............. *B01J 6/004* (2013.01); *B01J 4/002* (2013.01); *B01J 4/008* (2013.01);
(Continued)

(58) Field of Classification Search
CPC .......... F27B 9/028; F27B 9/2407; F27B 9/40; F27B 9/36; F27B 2007/365;
(Continued)

(56) References Cited

U.S. PATENT DOCUMENTS 1,867,122 A * 7/1932 Watts ..................... F27B 9/3011
                                                    432/64
3,182,981 A * 5/1965 Walker ..................... C21D 1/74
                                                    266/254
(Continued)

FOREIGN PATENT DOCUMENTS

CN   1756636 A   4/2006
CN   1768933 A   5/2006
(Continued)

OTHER PUBLICATIONS

Office Action cited in Korean patent application No. 10-2020-7010474; dated Jul. 19, 2021; 12 pp.
(Continued)

*Primary Examiner* — Steven S Anderson, II
(74) *Attorney, Agent, or Firm* — Lempia Summerfield Katz LLC

(57) ABSTRACT

The invention relates to a device for the thermal or thermo-chemical treatment, more particularly calcination, of material (12), more particularly battery cathode material (14), comprising a housing (16), in which a process space (20) is located. The material (12), or carrying structures (40) loaded with the material (12), can be conveyed in a conveying direction (30) into or through the process space (20) by means of a conveying system (28). A process space atmosphere (50) prevailing in the process space (20) can be heated by means of a heating system (48). There is a process gas system (64), by means of which a process gas (66) can be fed to the process space (20), said process gas being required for the thermal treatment of the material (12). The
(Continued)

process gas system (64) comprises a plurality of local injection units (68), which are arranged and configured such that process gas (66) can be released in a targeted manner onto the material (12) or onto the carrying structures (40) loaded with material (12), the process gas being released in a plurality of local process gas streams (70), each having a main stream direction (72). The invention also specifies a method for the thermal or thermo-chemical treatment of material (12), in which process gas (66) is released in a targeted manner onto the material (12) or onto the carrying structures (40) loaded with material (12), the process gas being released in a plurality of local process gas streams (70), each having a main stream direction (72).

17 Claims, 11 Drawing Sheets

(51) Int. Cl.
F27B 7/36 (2006.01)
F27B 9/02 (2006.01)
F27B 9/24 (2006.01)
F27B 9/36 (2006.01)
F27B 9/40 (2006.01)

(52) U.S. Cl.
CPC ......... F27B 2007/365 (2013.01); F27B 9/028 (2013.01); F27B 9/2407 (2013.01); F27B 2009/3638 (2013.01); F27B 9/40 (2013.01)

(58) Field of Classification Search
CPC ............ F27B 2009/3638; F27B 9/3011; F27B 2009/3016; F27B 2009/3038; F27B 2005/164; F27B 2007/367; B01J 6/004; B01J 6/002; B01J 4/008
See application file for complete search history.

(56) References Cited

U.S. PATENT DOCUMENTS

| | | | | |
|---|---|---|---|---|
| 3,729,832 A | * | 5/1973 | Lund | F26B 15/18 34/437 |
| 4,887,366 A | * | 12/1989 | Kuhl | F26B 15/12 34/229 |
| 5,628,878 A | | 5/1997 | Cutshall | |
| 6,881,702 B2 | | 4/2005 | Arnold et al. | |
| 2002/0136998 A1 | * | 9/2002 | Linke | F27B 9/36 432/146 |
| 2004/0034249 A1 | | 2/2004 | Arnold et al. | |
| 2005/0190645 A1 | | 9/2005 | Bolind et al. | |
| 2009/0171117 A1 | | 7/2009 | Arnold et al. | |
| 2010/0322836 A1 | | 12/2010 | Benham et al. | |
| 2012/0014863 A1 | | 1/2012 | Missalla et al. | |
| 2013/0043428 A1 | | 2/2013 | Kawahashi et al. | |

FOREIGN PATENT DOCUMENTS

| | | | | |
|---|---|---|---|---|
| CN | 101914807 A | | 12/2010 | |
| CN | 202254774 U | | 5/2012 | |
| CN | 102530923 A | | 7/2012 | |
| CN | 102997651 A | | 3/2013 | |
| CN | 103738956 A | | 4/2014 | |
| CN | 204787781 U | | 11/2015 | |
| DE | 3436906 A1 | * | 7/1986 | ........... B28B 11/243 |
| DE | 3436906 A1 | | 7/1986 | |
| DE | 68910820 T2 | | 5/1994 | |
| EP | 2778588 A1 | * | 9/2014 | ............ F27B 9/2407 |
| JP | H033698 U | | 1/1991 | |
| JP | 2014122720 A | | 7/2014 | |
| KR | 101177545 B1 | | 8/2012 | |
| KR | 101349263 B1 | | 1/2014 | |

OTHER PUBLICATIONS

ISR May 29, 2018, International Search Report cited in corresponding International application No. PCT/EP2017/079140; dated May 29, 2018; 4 pp.
Office Action cited in Chinese application No. 201780094842.X; dated Oct. 11, 2021; 8 pp.
Office Action cited in Japanese app No. 2020-515929; dated Oct. 5, 2021; 15 pp.
Communication cited in European patent application No. 17 808 363.0-11001; dated Jul. 4, 2022; 10 pp.

* cited by examiner

DEVICE AND METHOD FOR THERMAL OR THERMO-CHEMICAL TREATMENT OF MATERIAL

RELATED APPLICATION DATA

This application is a U.S. national stage of and claims priority benefit to prior filed international application no. PCT/EP2017/079140, filed Nov. 14, 2017, and which claims priority to German national application no. 10 2017 121 224.8, filed Sep. 13, 2017. The entire contents of these prior filed applications are hereby incorporated by reference herein.

BACKGROUND

1. Field of the Disclosure

The invention relates to an apparatus for thermal or thermochemical treatment, especially for calcination, of material, especially of battery cathode material.

2. Description of Related Art

The invention comprises:
a) a housing;
b) a process chamber within the housing;
c) a conveying system, by means of which the material or support structures laden with the material can be conveyed in a conveying direction into or through the process chamber;
d) a heating system, by means of which a process chamber atmosphere present in the process chamber can be heated up;
e) a process gas system, by means of which the process chamber can be supplied with a process gas required for the thermal treatment of the material.

The invention also relates to a method of thermal or thermochemical treatment, especially of calcination, of material, especially of battery cathode material, in which
a) the material or support structures laden with the material are conveyed through a process chamber of an apparatus for thermal treatment of the material (12);
b) a process chamber atmosphere present in the process chamber is heated up;
c) the process chamber is supplied with a process gas required for the thermal treatment of the material.

In such apparatuses and by such methods, for example in the production of lithium ion batteries, a pulverulent cathode material is calcined in an oxygen-containing atmosphere. The pulverulent cathode material is, for example, a lithium-containing transition metal precursor which is calcined in the kiln to give a lithium/transition metal oxide. In this operation, depending on whether lithium hydroxide or lithium carbonate precursor is used, the lithium-containing transition metal precursor releases water or carbon dioxide $CO_2$ as offgas.

To maintain the oxygen-containing atmosphere, the process chamber is supplied with fresh process gas, and the water or carbon dioxide $CO_2$ formed is removed from the combustion chamber by continuous or intermittent suction of the process chamber atmosphere.

In principle, apparatuses and methods of the type specified at the outset are alternatively used for the thermal treatment of other materials, which may, for example, also be workpieces that have to be treated thermally or thermochemically in a corresponding manner under the influence of a process gas.

The temperatures in such kilns may be up to 1200° C. The invention is further elucidated using the example of the thermal treatment of abovementioned cathode material. The temperature at which the calcination of such materials in practice depends, in a manner known per se, on the material to be treated and the type of kiln used.

In apparatuses and processes of the type specified at the outset that are known from the market, the process gas which is blown into the process chamber mixes with the atmosphere already present in the process chamber on the flow pathway toward the material to be treated. This mixed gas that ultimately arrives at the material therefore contains firstly the process gas in a relatively low concentration and secondly, inter alia, offgas already present in the process chamber atmosphere. The effect of the process gas on the material to be treated can therefore be influenced only in a relatively unsatisfactory manner, and monitoring and control of the atmosphere of the material is possible only with difficulty.

Furthermore, the temperature of the process gas fed in is generally considerably lower than the temperature of the atmosphere already present in the process chamber. The process gas fed in is frequently heated up insufficiently before it reaches the material to be treated, and so incomplete reactions may be the result. Furthermore, the cooler process gas can absorb heat from the material carriers or from other components of the conveying system, which can result in thermal stresses that can lead to higher wear and possibly to premature failure of the components.

The process gas does not have a defined flow direction when it reaches the material to be treated and can therefore influence the atmospheric conditions in the immediate proximity of the material only in an undefined manner. Moreover, the process gas takes a certain amount of time to reach the material.

SUMMARY

It is an object of the invention to provide an apparatus and a method of the type specified at the outset that take account of these concepts.

This object is achieved in an apparatus of the type specified at the outset in that
f) the process gas system comprises multiple local injection devices arranged and set up such that process gas in multiple local process gas streams each with a main flow direction can be delivered targeted onto the material or onto the support structures laden with material.

This shall be understood to mean that a local process gas stream in question, based on a site of incidence, is directed to the material and/or to a support structure in axial extension of the corresponding main flow direction, but that it is quite possible for a proportion of the local process gas stream in question not to arrive at this site of incidence since the local process gas stream can, for example, widen out in main flow direction and/or turbulence and vortexing in the process chamber prevent a strictly directed local process gas stream.

In any case, however, it is possible in this way to achieve the effect that a defined amount and a defined proportion of process gas arrives at the material, as a result of which the reaction conditions that actually exist at the material can be established in a reproducible manner. For instance, it is possible that the material in the process chamber or the material in all support structures present may be subjected to the same or defined thermal and atmospheric conditions.

It is favorable here when at least one of the local injection devices comprises multiple injection nozzles. For instance, one local injection device can produce multiple directed process gas streams.

It is particularly advantageous when at least one of the injection nozzles is movable by motor or manually, such that the main flow direction of the process gas stream generated by means of that injection nozzle is adjustable. In this case, for example, an adjustment may be made when different support structures have to be used or the conveying system is altered in some other way. It is also possible in this way to alter and optimize the process gas flow regime on site.

Preferably, at least one local injection device takes the form of an injection bar.

Preferably, such an injection bar runs horizontally or vertically; alternatively, progressions inclined relative to a horizontal and/or vertical plane are possible.

It is favorable for construction purposes when at least one local injection device is secured to the base or to the roof of the housing.

In an advantageous variant, at least one local injection device is an injection wall section of an injection wall that divides an interior of the housing into the process chamber and an injection chamber that can be supplied with process gas.

In order that process gas can then flow from the injection chamber into the process chamber, the injection wall section preferably has multiple passage openings, especially passage slots, that fluidically connect the process chamber to the injection chamber.

In a further development, the conveying system comprises at least one process housing on which the material or support structures laden with the material can be conveyed in conveying direction into or through the process chamber, wherein the process housing comprises at least one injection wall section.

It is favorable when the injection wall section of the process housing takes the form of a hollow wall with a wall interior that can be supplied with process gas.

A particularly effective flow regime is possible when the process gas system or at least one local injection device are set up in such a way that multiple process gas streams can be delivered at different angles based on conveying direction and a horizontal reference plane.

For conveying purposes, it is favorable when the conveying system comprises at least one support structure for the material. This is the case especially for materials such as the cathode material addressed.

It is also favorable when multiple support structures form a conveying frame having flow passages which keep a respective interior of the support structures accommodating the material connected to the environment for flow purposes. In this way, it is ensured that the process gas can reach the material in the support structures without hindrance.

In coordination with this, it is advantageous when the local injection devices are set up and adjusted such that at least some of the process gas streams flow through one or more flow passages.

In order to achieve, in coordination with the conveying system, a temperature distribution of maximum homogeneity in the process chamber and directed supply of the process gas, it is favorable when the conveying system has a conveying track or multiple conveying strands along which the support structures are conveyed, and in that local injection devices of the process gas system and/or heating elements of the heating system are disposed on one or both sides of the conveying track or at least one conveying strand.

When multiple conveying strands are present, it is favorable when two adjacent conveying strands are spaced apart from one another, so as to form an intermediate region there in which heating elements of the heating system and/or one or more local injection devices are disposed.

Particularly in combination with injection bars, it is favorable when the heating system comprises heating elements in the form of vertical heating bars.

It is particularly advantageous when the process gas system is set up such that various local injection devices can be fed with different kinds of process gas. The spatially defined delivery geometry of the local injection devices makes it possible to establish different regions with different atmospheres for other types of treatment in the process chamber without these different regions having to be spatially separated from one another.

The abovementioned object is correspondingly achieved in a method of the type specified at the outset in that
  d) process gas in multiple local process gas streams each with a main flow direction is delivered targeted onto the material or onto the support structures laden with material.

More particularly, an apparatus for thermal treatment having some or all features of the apparatus elucidated above is used here.

The advantages of the method correspond to the advantages that have been discussed for the apparatus.

BRIEF DESCRIPTION OF THE DRAWINGS

There follows a detailed elucidation of working examples of the invention with reference to the drawings. These show.

DETAILED DESCRIPTION

Figure 1:
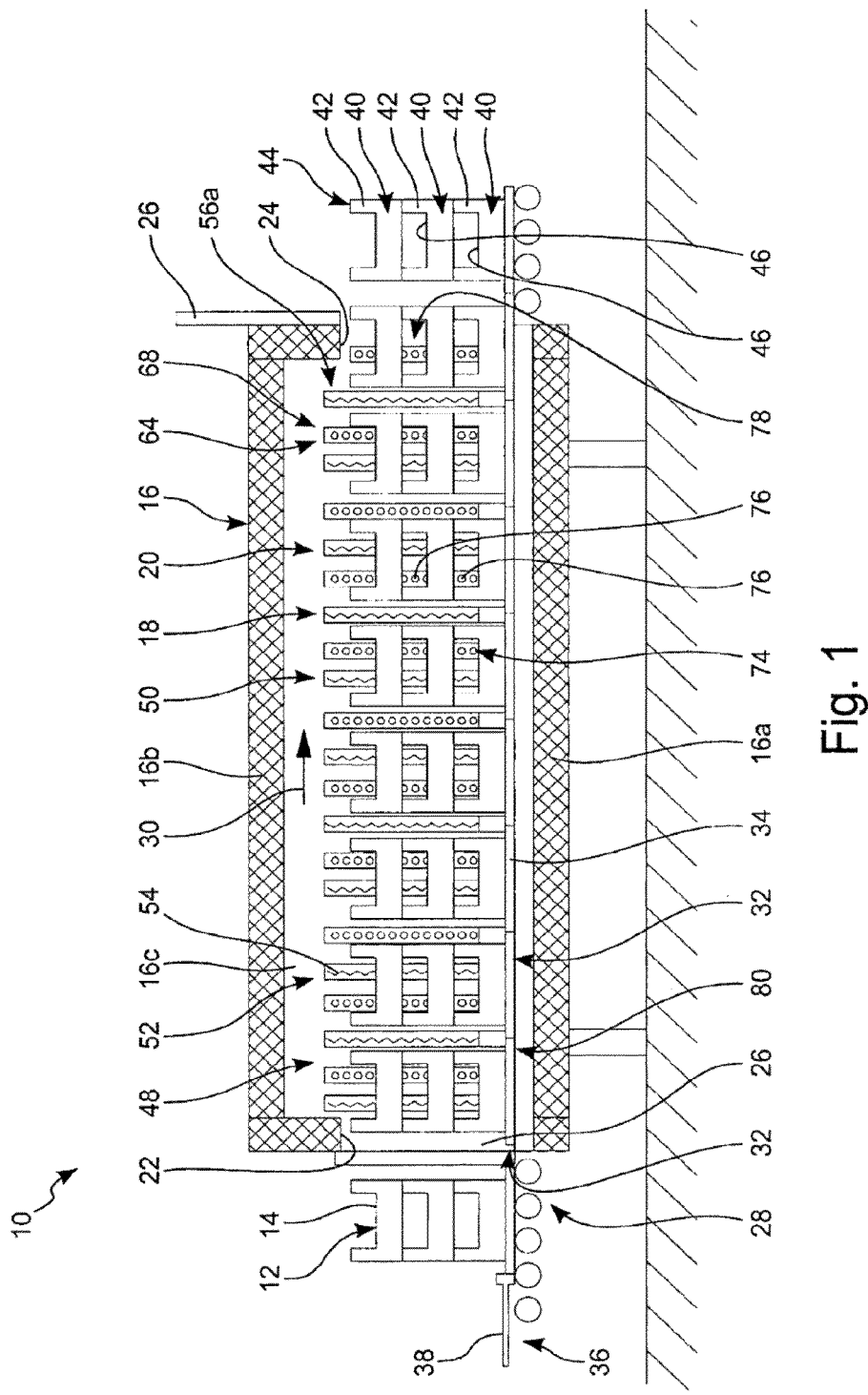
FIG. 1 a vertical longitudinal section of a tunnel kiln in a first working example with a heating system comprising multiple vertical heating bars, and a process gas system having multiple local injection devices in the form of vertical injection bars.

Reference is made first of all to FIGS. 1 to 4. In these, 10 denotes an apparatus for thermal treatment of material 12. This apparatus 10 is referred to hereinafter as kiln 10 for the sake of simplicity.

The material 12 may, for example, be battery cathode material 14 elucidated at the outset that has to be calcined by a thermal treatment in the kiln 10 in the production of batteries.

The kiln 10 comprises a housing 16 having a base 16a, a roof 16b and two vertical side walls 16c and 16d, which bounds an interior 18 in which there is a process chamber 20. The housing 16 thus forms the housing of the process chamber 20. The interior 18 of the kiln 10 may optionally be defined by a separate housing that surrounds the housing 16. As apparent in FIG. 1, the process chamber 20 extends between an entrance 22 and an exit 24 of the housing 16, each of which is closable by a gate 26. Alternatively, it is also possible for there to be an open entrance 22 and an open exit 24 or else, by contrast, a gas-tight double-gate lock in each case, by which separation of the atmosphere in the kiln from the surrounding atmosphere is assured.

The material 12 is conveyed through the process chamber 22 in a conveying direction 30 with the aid of a conveying system 28; the conveying direction 30 is indicated by an arrow in FIG. 1 only. In the present working example, the kiln 10 is designed as a tunnel kiln and specifically as a pusher kiln, in which the conveying system 28 conveys the material 12 through the kiln 10. For this purpose, the conveying system 28 comprises a conveying track 32 along which multiple application trays 34 are pushed, as known per se. In each of the figures, just one application tray is given a reference numeral.

The conveying system 28 comprises a pusher device 36 with a driven pusher ram 38 that pushes an application tray 34 from the outside through the entrance 22 into the process chamber 20. This application tray 34 abuts the first application tray 34 in conveying direction 30 that is already within the process chamber 20, as a result of which all application trays 34 present in the process chamber 20 are pushed one place further, and the last application tray 34 in conveying direction 30 is pushed out of the process chamber 20 through the exit 24.

In the case of modifications that are not shown specifically, other designs for tunnel kilns that are known per se are also possible, for example all kinds of roller kilns, conveyor belt kilns, chain conveyor kilns, driven kilns and the like. Alternatively, the kiln 10 may also take the form of a batch kiln with just one access. In this case, individual batches of the material 12 are conveyed into the process chamber 20 in conveying direction 30 through this access, treated thermally, then removed again from the process chamber 20 through the access in the opposite direction to conveying direction 30, and in this way conveyed through the process chamber 20 overall.

The material 12, depending on its characteristics, may be conveyed as such with the aid of the conveying system 28 and be placed, for example, directly on the application trays 34. This is possible, for example, when the material 12 comprises structural workpieces.

In the present working example, support structures 40 laden with the material 12 are provided, which, in the case of the battery cathode material 14, take the form of saggars 42. These support structures 40 may be placed one on top of another to form a conveying frame 44 in the form of a shelving system with multiple levels, wherein, in the present working example, three support structures 40 each laden with battery cathode material 14 form a conveying frame 44 and each application tray 34 bears such a conveying frame 44. Also conceivable are two or more than three, for example four, five, six or more, levels per conveying frame 44; the number of possible levels depends largely on the construction height of the process chamber 20 and the support structures 40. In the case of a modification, the conveying frame 44 is a separate component, for example made of metal or ceramic, that accommodates the support structures 40 in multiple levels.

The support structures 40 and consequently also the saggars 42 are set up in such a way that, in the case of support structures 40 stacked one on top of another, flow passages 46 remain in the conveying frame 44, such that a respective interior of the support structures 40 or of the saggars 42 in which the material 12 is accommodated remains connected to the environment within the process chamber 20 for flow purposes. In the working example shown here, in circumferential direction of the conveying frame 44, one flow passage 46 is present on each of four available sides, such that flows in or counter to conveying direction 30 and flows transverse thereto get into the support structures 40 or the saggars 42.

Figure 2:
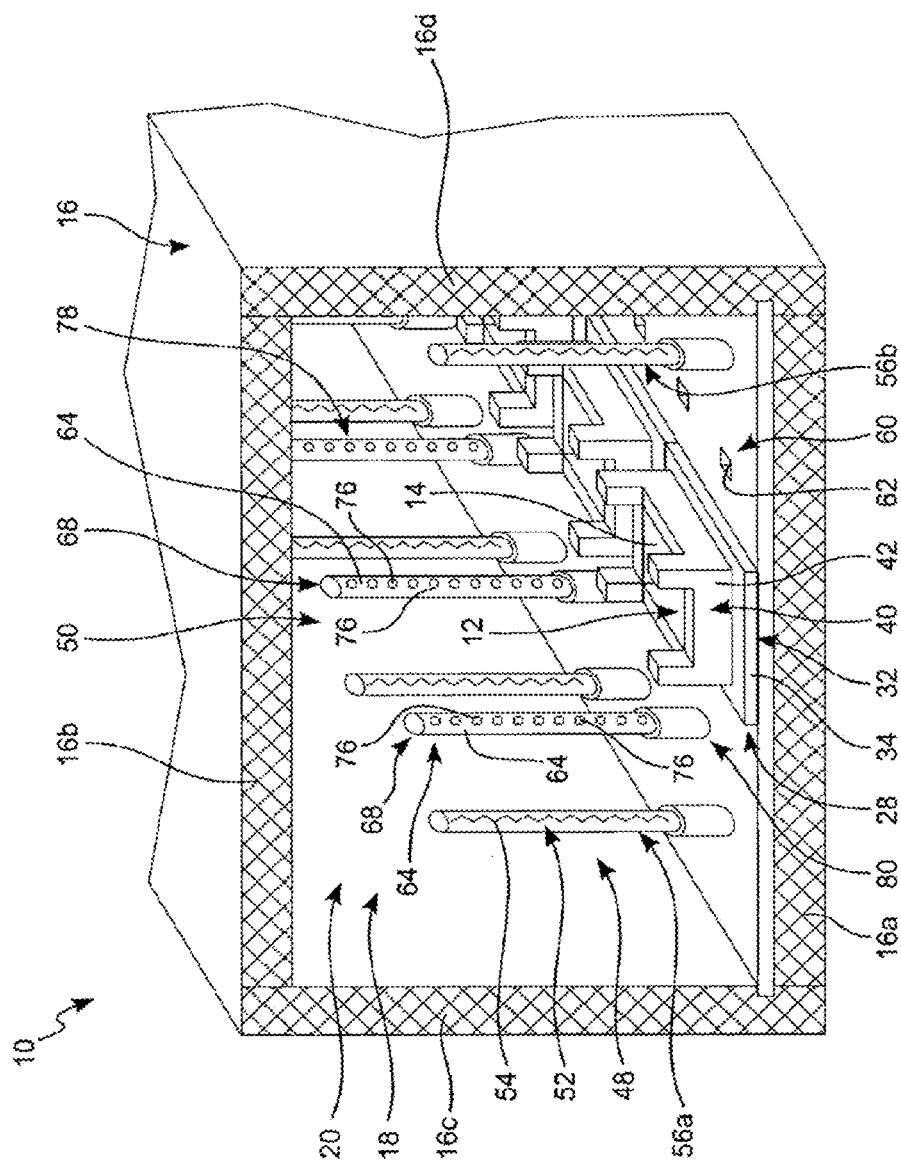
FIG. 2 a perspective cross section of the tunnel kiln of FIG. 1, showing just one kiln sector.

In FIG. 1, components 40 to 46 are given reference numerals only in the conveying frame shown far right in FIG. 1. FIG. 2 shows a modification in every application tray 34 carries just a single support structure 40.

The kiln 10 comprises a heating system 48, by means of which a process chamber atmosphere 50 within the process chamber 20 is heatable. For that purpose, the heating system 48 comprises multiple electrical heating elements 52 disposed in the process chamber 20.

In the working example shown in FIGS. 1 to 4, the heating elements 52 take the form of vertical heating bars 54 arranged in the form of respective rows of heating bars 56a and 56b spaced apart from one another on the side walls 16c, 16d along the conveying track 32, such that the conveying track 32 extends between the rows of heating bars 56a, 56b. The vertical heating bars 54 are each secured to the base 16a of the housing 16. The heating output of the heating bars 54 may be adjusted individually for each heating bar 54 or for groups of heating bars 54. Optionally, the heating bars 54 may also have multiple heating sectors that may in turn be actuated independently of one another.

In this arrangement of the heating elements 52 and also in the arrangements described further down, the separation of the heating elements 52 from the support structures 40 or the saggars 42 is substantially constant. This enables a good throughput of support structures 40 through the kiln 10, since there are only slight or at best no inhomogeneities in the temperature profile in the process chamber 20 that would have to be taken into account.

The thermal treatment of materials 12 can give rise to an offgas 58 that has to be drawn off from the process chamber 20. Such an offgas 58 is indicated by short dotted lines and given a reference numeral in FIG. 3 only. The offgas 58 formed in the calcination of battery cathode material 14 is, for example, the abovementioned water or carbon dioxide $CO_2$. In addition, lithium-containing phases may be released.

In order to be able to remove offgas 58 from the process chamber 20, a suction system 60 is present, comprising suction openings 62 in the base 16a of the housing 16, by means of which the offgas 58 can be sucked out of the process chamber 20. Components that are also needed for the purpose and are known per se, such as fans, conduits, filters and the like, are not shown separately for the sake of clarity. The suction openings 62, incidentally, are shown in the cross sections in FIGS. 3, 5, 7 and 9 only.

In the kiln 10, materials 12 that require a process gas for thermal treatment may be subjected to thermal treatment. In the case of the battery cathode material 14 addressed, oxygen $O_2$, for example, is required for effective calcination, which is blown into the process chamber 20 in the form of conditioned air. In this case, consequently, air constitutes such a process gas. The oxygen $O_2$ present therein is converted in the formation of the metal oxide, forming water or carbon dioxide $CO_2$. In other processes, other process gases may be required. In some processes, oxygen-enriched air or else pure oxygen is required; the oxygen content of such process gases may be 21% to 100%. An inert gas may also be regarded as process gas necessary for seamless thermal treatment.

Therefore, the kiln 10 comprises a process gas system 64, by means of which the process chamber 20 can be supplied with a process gas 66 required for the thermal treatment of the material 12.

The elements and components having reference numerals 68 to 80 that are elucidated hereinafter are not all given a reference numeral in the figures for the sake of clarity.

Figures 3, 4:
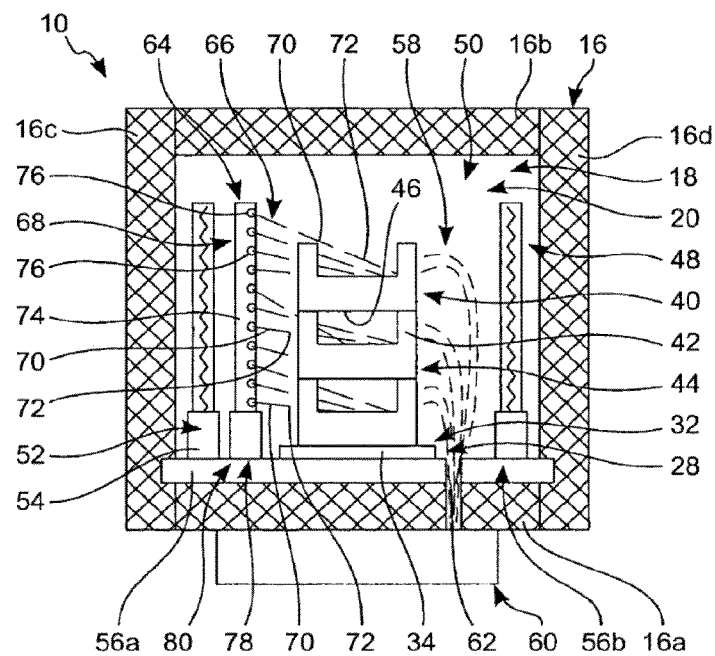
FIG. 3 a cross section of the tunnel kiln of FIG. 1.
FIG. 4 a horizontal longitudinal section of a sector of the tunnel kiln of FIG. 1.

The process gas system 64 comprises multiple local injection devices 68 that are arranged and set up in such a way that process gas 66 in multiple local process gas streams 70 each with a main flow direction 72 can be delivered in a controlled manner, i.e., targeted onto or aimed at, the material 12 or onto the support structures 40 laden with material 12, which is illustrated in FIG. 3 and is as elucidated at the outset.

In addition to the local injection devices 68, the process gas system 64 may also ensure a general process gas regime as known per se. For this purpose, process gas 66 can be blown into the process chamber 20, for example, via blowing devices that are correspondingly present, for example blower boxes, without this process gas 66 blown in in this way being delivered to the material 12 and/or support structures 40 or conveying frames 44 used in a directed manner.

The process gas 66, the multiple process gas streams 70 and the respectively corresponding main flow direction 72 are indicated by the long dotted lines and given reference numerals in FIG. 3 only.

The local injection units 66 in the working example according to FIGS. 1 to 4 take the form of vertical injection bars 74 having multiple injection nozzles 76 arranged along the vertical injection bars 74.

The injection bars 74 in practice are manufactured from metal, especially from stainless steel, or from ceramic. Useful materials are in principle all of those that can withstand the conditions in a corresponding kiln 10.

The vertical injection bars 74 flank the conveying track 32 therein on the left-hand side in conveying direction 30 and are spaced apart from one another along the conveying track 32 so as to form a row of injection bars 78, wherein the separations between two adjacent vertical injection bars 74 are the same. The vertical injection bars 74 are each secured to the base 16a of the housing 16, from which they are supplied with process gas 66 via a supply device collectively labeled 80. Components needed for the purpose, such as fans, conduits, a process gas source and the like, are not shown separately for the sake of clarity.

The individual injection nozzles 76 may be formed by simple exit openings that may be configured as a circular opening, oval or slot. Alternatively, the injection nozzles 76 may also be encompassed by the vertical injection bars 74 as separate assemblies. In this case, the injection nozzles 76 may be movable, such that the main flow direction 72 of the local process gas stream 70 released can be adjusted individually for each injection nozzle 76. This is illustrated in FIG. 3 by different profiles of the process gas streams 70.

It is also possible for injection nozzles 76 in the form of exit openings and injection nozzles 76 in the form of separate assemblies and also different nozzle geometries to be combined with one another.

The injection nozzles 76 may project into the process chamber 20 with respect to the main outline of the corresponding injection bar 74.

The respective adjustments of the injection nozzles 76 may be fixed in the production of the vertical injection bars 74, for example by means of appropriate oblique profiles of exit openings through the wall of a vertical injection bar 74, and be matched to conveying structures 40 and conveying frames 44 formed therefrom that are to be used. The injection nozzles 76 may be formed here in such a way that the process gas streams 70 released run parallel or differently, as illustrated in FIG. 3.

Alternatively or additionally, some or all injection nozzles 76 may also be movable and adjustable by motor or at least manually, such that the local injection devices 68 in the presence of a kiln 10 may be matched to different support structures 40 or saggars 42 and/or support frames 44.

As is likewise apparent in FIG. 3, the individual injection nozzles 76 are set up such that multiple process gas streams 70 in each case reach the material 12 accommodated by the support structures 40 through a flow passage 46 of the conveying frame 44 in each case.

The process gas streams 70 may be delivered from the local injection devices 68 at an angle of 90° based on conveying direction 30, or else at an angle of less than 90° in conveying direction 30 or counter to conveying direction 30. Furthermore, the process gas streams may be delivered from the local injection devices 68 parallel to a horizontal reference plane or in an upward or downward inclination relative to such a horizontal reference plane. This may be advisable, for example, when shadowing by parts of the support structures 40 or of the conveying frame 44 are to be substantially reduced to a minimum. A particularly effective method here may be quasi-chaotic delivery of different process gas streams 70 from individual injection nozzles 76 at different angles relative to conveying direction 30 and/or a horizontal reference plane.

In general terms, the local injection devices 68 are set up such that they can deliver process gas streams 70 at different angles based on conveying direction 30 and a horizontal reference plane. If local injection devices 68 present have, for example, just a single injection nozzle 76 in each case, their delivery angles are different. Again in general terms, it is at least the case that the process gas system 64 is set up such that process gas streams 70 can be delivered at correspondingly different angles.

It is possible here for multiple injection nozzles 76 that deliver process gas streams 70 at different angles to be arranged in the same or different horizontal planes.

Owing to the local injection devices 68, it is immaterial that the support structures 40 in one and the same conveying frame 44 or else the support structures 40 of two adjacent conveying frames 44 shadow one another. By means of the local injection devices 68, all support structures 40 and all material 12 in the process chamber 20 are supplied and contacted largely homogeneously with process gas 66, such that the thermal treatment of the material 12 in all support structures 40 is reproducible to a high degree and runs uniformly.

Firstly, in this way, process gas 66 reaches the process site on the material 12; secondly, the process gas streams 70 displace the offgas 58 formed, thus water or carbon dioxide $CO_2$ in the present case, and can thus be sucked effectively out of the process chamber 20 by the suction system 60.

The local supply of the process gas 66 alters the partial gas pressure in the immediate proximity of the material 12, which in turn influences the process parameters and thereby influences the chemical and physical properties of the product formed.

The targeted release of the process gas 66 can increase the quality of the product obtained, and production waste can be reduced in this way. Furthermore, it is possible to save process gas 66.

With the aid of the process gas streams 70 delivered in a targeted manner, it is also possible to influence the temperature at the material 12 to be treated. It is possible either to homogenize the temperature in the environment of the material 12 or to bring about a controlled heterogeneous temperature profile over the material 12. These effects can be brought about by appropriate prior conditioning of the process gas 66 by means of the process gas system 64 or else by appropriately matched delivery of the process gas 66 by the local injection devices 68.

The process gas 66 can be delivered by the local injection devices 68 in a continuous or pulsed manner; this is established by an appropriate controller and appropriate targeting means for the process gas system 64. It is also possible to design and actuate some local injection devices 68 or else just some injection nozzles 76 in local injection devices 68 in such a way that they deliver a continuous local process gas stream 70, whereas other local injection devices 68 or the other injection nozzles 76 of the local injection devices 68 in question may be designed and actuated in such a way that they deliver a pulsed local process gas stream 70.

As is clearly apparent particularly in FIG. 4, the vertical injection bars 74, relative to the vertical heating bars 54, should be offset in the direction of the conveying track 32 and each arranged between two vertical heating bars 54. In this way, on the one hand, the vertical injection bars 74 are arranged close to the material 12 and, on the other hand, the vertical heating bars 54 are not shadowed in the direction of the conveying track 32.

There follows an elucidation of further working examples with reference to FIGS. 5 to 13. In these figures, only the essential elements and components addressed are given reference numerals.

Figure 5:
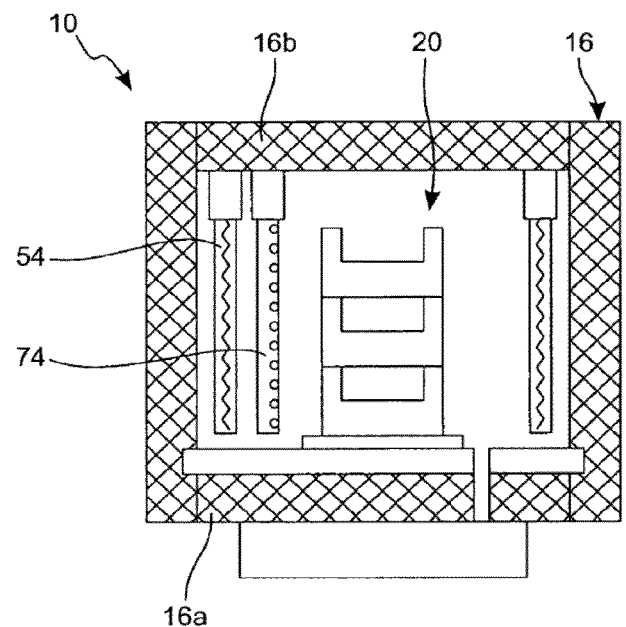
FIG. 5 a cross section of a tunnel kiln in a second working example with modified heating system and modified process gas system.

FIG. 5 shows a second working example of a kiln 10. In this kiln, both the vertical heating bars 54 and the vertical injection bars 74 are secured not to the base 16*a* of the housing but to the roof 16*b* thereof, from which they project downward into the process chamber 20.

Figure 6:
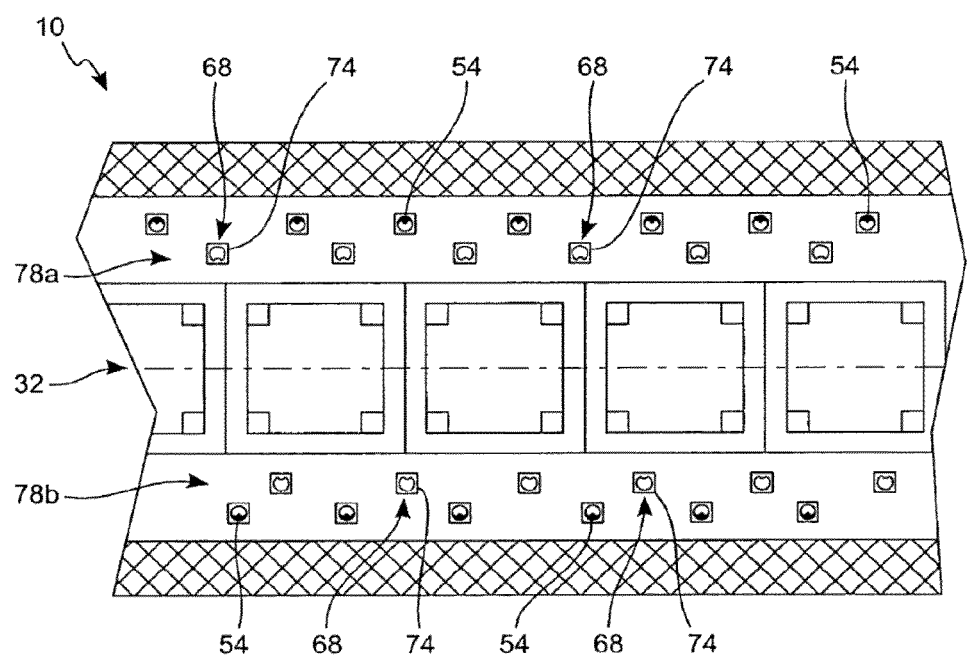
FIG. 6 a horizontal longitudinal section of a sector of a tunnel kiln in a third working example with modified process gas system.

In the third working example shown in FIG. 6, the local injection devices 68 in the form of the vertical injection bars 74 are arranged on both sides of the conveying track 32, such that two rows of injection bars 78*a* and 78*b* are formed there. The vertical injection bars 74 of the respective row of injection bars 78*a*, 78*b*, relative to the vertical heating bars 54 on the same side of the conveying track 32, should again each be offset in the direction of the conveying track 32 and each arranged between two vertical heating bars 54.

Figure 7:
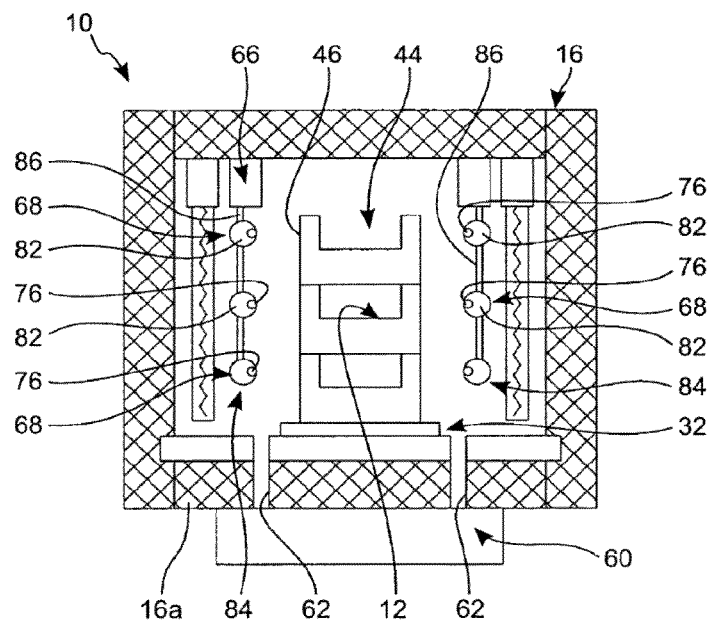
FIG. 7 a cross section of a tunnel kiln in a fourth working example with another modification of the process gas system comprising horizontal injection bars.
Figure 8:
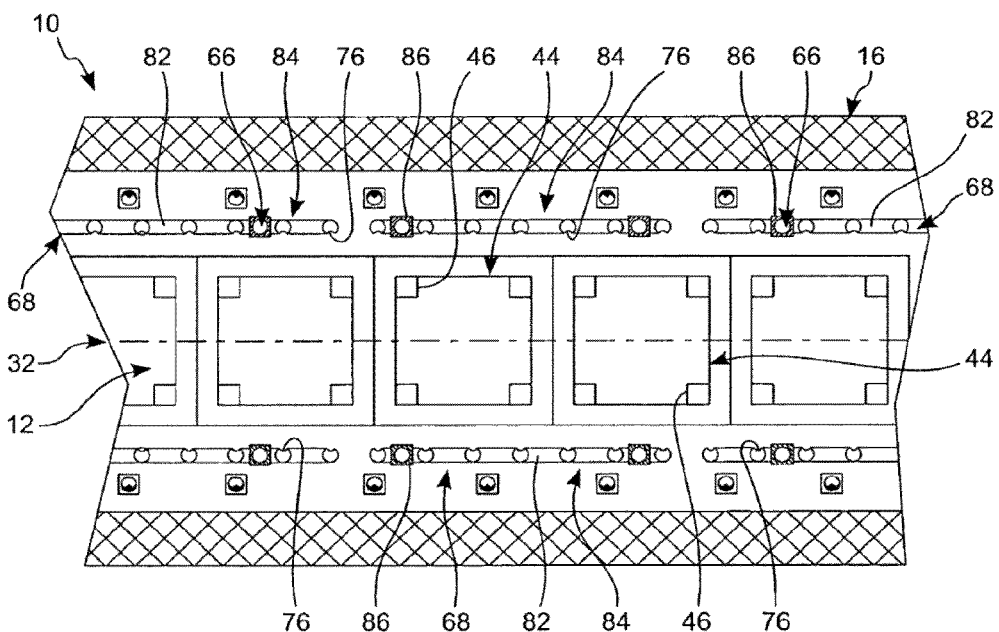
FIG. 8 a horizontal longitudinal section of a sector of the tunnel kiln of FIG. 7.

FIGS. 7 and 8 show a fourth working example of a kiln 10 in which the local injection devices 68 do not take the form of vertical injection bars but of horizontal injection bars 82 that extend parallel to the conveying track 32 on both sides thereof in conveying direction 30. In this case, multiple horizontal injection bars 82 spaced apart in vertical direction in each case, three in the present working example, form a horizontal group of bars 84 that is fed collectively with process gas 66. For this purpose, the horizontal injection bars 82 of a horizontal group of bars 84 are connected to one another for flow purposes via connecting conduits 86.

The individual horizontal injection bars 82 are situated here at height levels appropriate for the height levels of the flow passages 46 in the conveying frames 44, such that the process gas streams 70 have good accessibility to the material 12 in the conveying frames 44.

By contrast with the working examples according to FIGS. 1 to 5, suction openings 62 of the suction system 60 are provided on both sides of the conveying track 32 in the base 16*a* of the housing 16. This is generally the case in principle when injection bars are present on both sides of the conveying track 32, since offgas 58 is then also displaced from the conveying frames 44 in both directions transverse to conveying direction 30. In principle, suction openings 62 may be provided at all suitable positions in the kiln 10, including in the roof and also in different positions in different kiln regions. A particular factor material to the arrangement of the suction openings 62 is the density of the offgas 58; in the case of offgases 58 lighter than air, an elevated position of the suction openings 62, especially even in the roof, is an option; in the case of offgases 58 heavier than air, the offgas openings 62 are provided in lower regions of the kiln 10 and especially in the base 16*a* thereof.

As can be seen from FIG. 8, individual horizontal injection bars 82 do not extend over the entire length of the process chamber 20. Correspondingly, multiple horizontal injection bars 82 are present at the same level in conveying direction 30, or correspondingly multiple horizontal groups of bars 84 are present.

The horizontal injection bars 82 may be manufactured from the same materials as the vertical injection bars 74.

Figure 9:
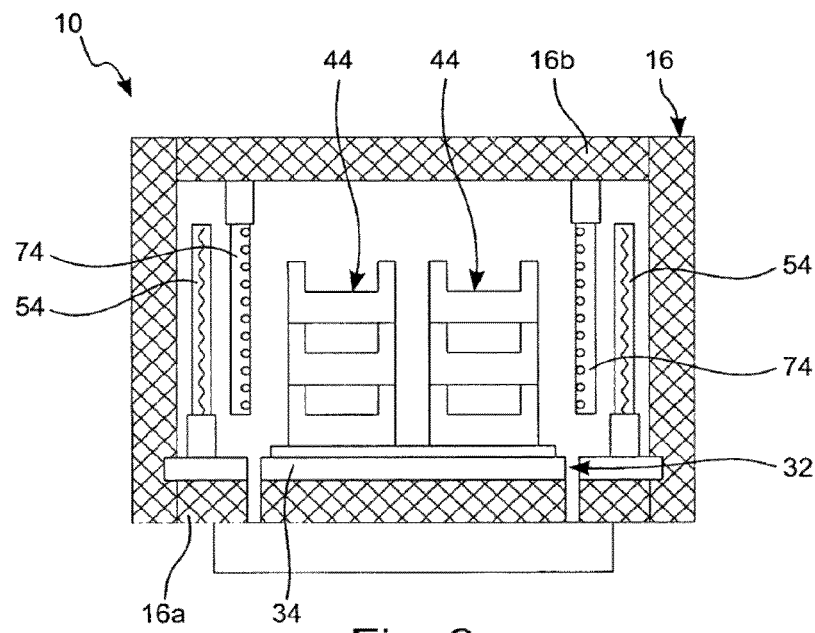
FIG. 9 a cross section of a tunnel kiln in a fifth working example, again with vertical injection bars and a modified conveying system.

FIG. 9 illustrates a fifth working example in which the conveying track 32 and the application trays 34 conveyed thereon are designed with such width that two conveying frames 44 are accommodated alongside one another on one application tray 34, based on conveying direction 32.

There are again vertical heating bars 54 and vertical injection bars 74 present therein, with a modification being shown in which the vertical heating bars 54 are secured to the base 16a and the vertical injection bars 74 to the roof 16b of the housing 16 of the kiln 10.

Figure 10:
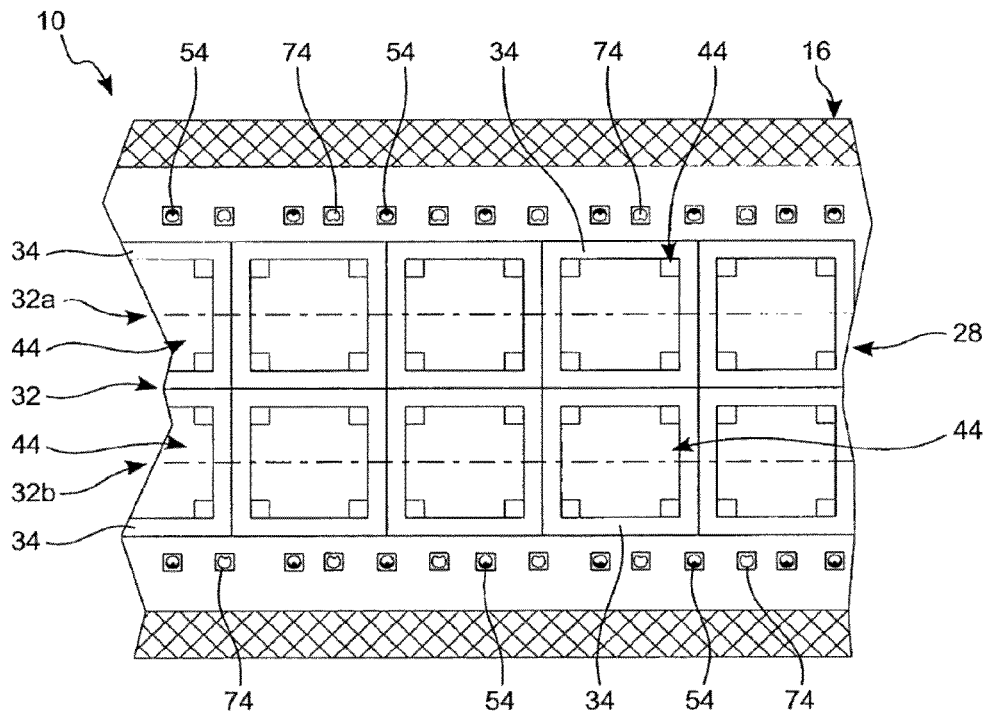
FIG. 10 a horizontal longitudinal section of a sector of a tunnel kiln in a sixth working example with another modification of the conveying system and a modified arrangement of vertical heating bars and vertical injection bars.

In the sixth working example shown in FIG. 10, the vertical heating bars 54 and the vertical injection bars 74 are no longer offset in the direction transverse to conveying direction 30, but are arranged successively alternating in conveying direction 30 on each side of the conveying track 32. The separations of the heating bars 54 and of the injection bars 74 from the conveying track 32 or from the material 12 are consequently identical therein.

FIG. 10 also shows a modification in which the conveying track 32 is divided into two conveying strands 32a, 32b, on which conveying frames 44 present in each case may each independently be conveyed on an application tray 34 designed for one conveying frame 44. For this purpose, the conveying system 28 comprises, at the entrance 22 to the housing 16, a separate pusher device 36 for each conveying strand 32a, 32b, optionally each with a separate pusher ram 38, which is not apparent in FIG. 10 on account of the cutout.

Figure 11:
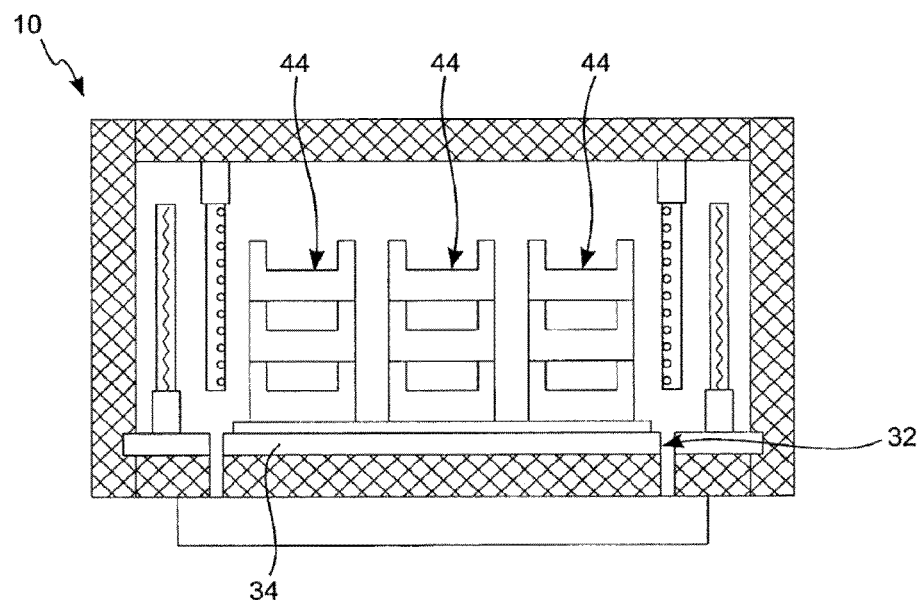
FIG. 11 a cross section of a tunnel kiln in a seventh working example with another modification of the conveying system.

In the seventh working example shown in FIG. 11, the conveying track 32 and the application trays 34 conveyed thereon are broadened again, such that one application tray 34 can accommodate three conveying frames 44 alongside one another.

In a corresponding manner, based on the two conveying strands 32a, 32b, in the sixth working example according to FIG. 10, the conveying track 32 here may be divided into three separate conveying strands on which conveying frames 44 present in each case can each be conveyed independently on an application tray 34 designed for one conveying frame 44. In this case, the conveying system 28 comprises, at the entrance 22 to the housing 16, a separate pusher device 36 for each of the three conveying strands, optionally each with a separate pusher ram 38.

Figure 12:
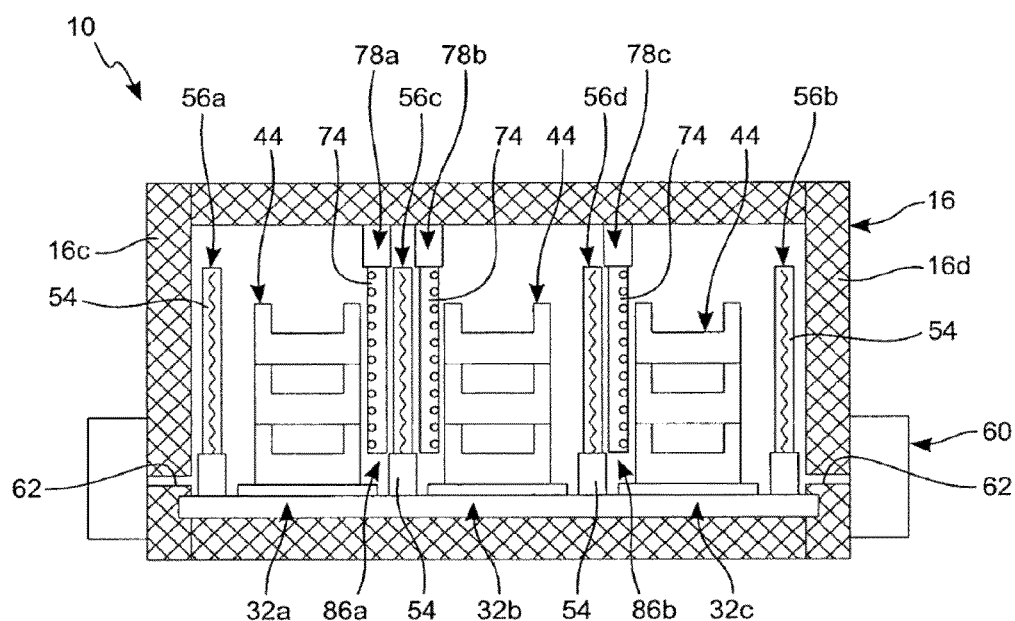
FIG. 12 a cross section of a tunnel kiln in an eighth working example with another modification of the conveying system and a modified arrangement of vertical heating bars and vertical injection bars.

An eighth working example illustrated in FIG. 12 adopts this concept, wherein the three conveying strands 32a, 32b, 32c present therein are spaced apart from one another in the direction transverse to conveying direction 30, such that a first intermediate region 88a between the conveying strands 32a and 32b and a second intermediate region 88b between the conveying strands 32b and 32c are formed therein.

In addition to the rows of heating bars 56a and 56b along the side walls 16c and 16d of the housing 16, two further rows of heating bars 56c and 56d with vertical heating bars 54 are present in the intermediate regions 88a and 88b.

Also disposed in the first intermediate region 88a are two rows of injection bars 78a and 78b with vertical injection bars 74, of which the first row of injection bars 78a is assigned to the first, left-hand conveying strand 32a in conveying direction 30 and the second row of injection bars 78b to the second, middle conveying strand 32b in conveying direction 30. Correspondingly disposed in the second intermediate region 88b is a third row of injection bars 78c assigned to the in third, right-hand conveying strand 32c in conveying direction 30.

The injection bars 74, based in each case on the heating bars 54 in the intermediate regions 88a, 88b, are in an offset arrangement here in the direction of the respectively assigned conveying strand 32a, 32b or 32c.

The suction openings 62 of the suction system 60 in this working example are provided in the side walls 16c, 16d of the housing 16.

Figure 13:
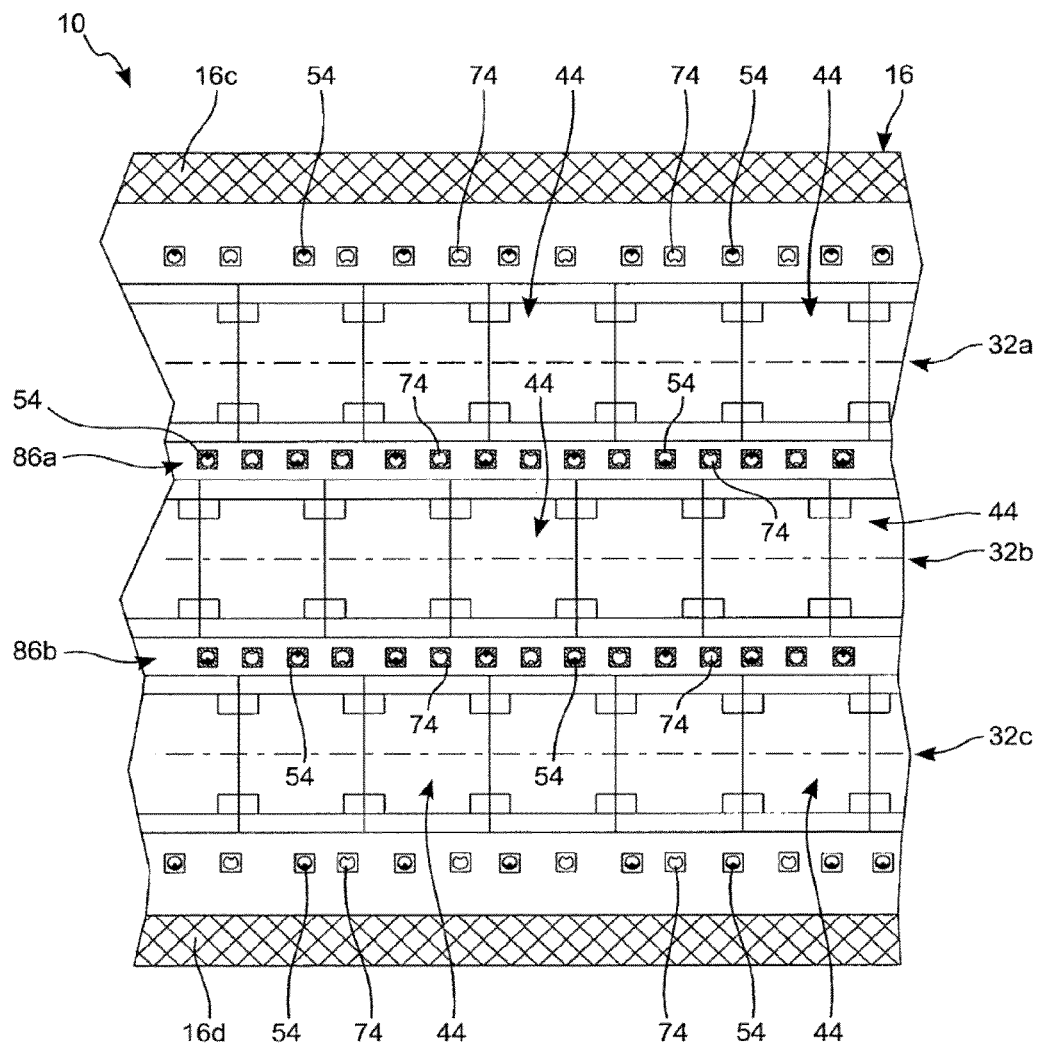
FIG. 13 a horizontal longitudinal section of a sector of a tunnel kiln in a ninth working example with another modification of the arrangement of vertical heating bars and vertical injection bars.

FIG. 13 shows a ninth working example in which vertical heating bars 54 and vertical injection bars 74 are each arranged alternately and without such an offset in the intermediate regions 88a and 88b. The vertical heating bars 54 here, in the first intermediate region 88a in conveying direction 30, always act alternately to the right and left on the conveying strands 32a and 32b and, in the second intermediate region 88b in conveying direction 30, always alternately to the right and left on the conveying strands 32b and 32c.

In a corresponding manner, the vertical injection bars 74 in the first intermediate region 88a deliver their process gas streams 70 in conveying direction 30 always alternately to the right and left in the direction of the conveying strands 32a and 32b and, in the second intermediate region 88b in conveying direction 30, always alternately to the right and left in the direction of the conveying strands 32b and 32c.

Along the side wall 16c of the housing 16 too, there is an alternating arrangement of vertical heating bars 54 and vertical injection bars 74, each of which, however, act in the direction of the first conveying strand 32a. Along the opposite side wall 16d of the housing 16, a corresponding alternating arrangement of vertical heating bars 54 and vertical injection bars 74 is provided, each of which act in the direction of the third conveying strand 32c.

As apparent in FIG. 13, the conveying frames 44 on the individual conveying strands 32a, 32b and 32c are conveyed offset to one another in conveying direction 30.

A corresponding intermediate region may also be present in the case of the two conveying strands 32a and 32b in the working example of FIG. 10, in which heating elements 52 of the heating system 48 and local injection devices 68 of the process gas system 64 may then also be arranged analogously.

If an intermediate region is present between two conveying strands, it is also possible for suction openings 62 of the suction system 60 to be provided therein. In this way, it is possible to create largely symmetrical flow conditions by supplying process gas 66 from the side and sucking out the offgas 58 in the middle.

In the thermal treatment of materials 12, it may be necessary for different process gases to be supplied to the material 12 in two different process steps. In this case, the process chamber 20 has at least two process regions. Local injection devices 68 present in these process regions are then supplied independently from the process gas system 64 with the process gas required for the respective process region. The parameters required for the operation of the respective local injection devices 68 in the respective process regions may be adjusted here independently of one another. These include not only the nature of the respective process gas but also factors including its temperature, the delivery pressure and the volume delivered per unit time.

In a modification which is not shown separately, heating elements 52 and local injection devices 68 may be combined to form a local heating and injection device. In this way, it is also still possible, inter alia, to thermally influence process gas 66 when it exits from the injection nozzles 76.

In all the working examples described, the heating elements 52 take the form of vertical heating bars 54. In modifications that are not shown separately, horizontal heating bars may be provided alternatively or additionally. Such horizontal heating bars may extend over the entire length of the process chamber 20. In one variant, it is also possible for multiple horizontal heating elements to be arranged in succession in conveying direction 30, each of which extend only over a section of the process chamber 20. In vertical direction, it is possible in each case for multiple horizontal heating bars to be provided, each separated from one another.

Local injection devices 68 disposed at the entrance 22 or at the exit 24 of the housing 16 may be used to establish a respective flow lock, in order to prevent or at least reduce mixing of the process gas atmosphere 50 in the process chamber 20 with the surrounding atmosphere outside the housing 16.

In other modifications that are not shown separately, the local injection devices 68 may also be arranged at irregular distances or in irregular arrangements in conveying direction 30. This is favorable especially when the thermal treatment is to take place, for example, in successive thermal stages. Alternatively, the process gas system 64 may also be set up such that various local injection devices 68 can also deliver different process gas streams 70 that differ in the volume delivered per unit time and/or by their temperature.

In addition, in the working examples elucidated, the local injection devices 68 on the side walls 16c and 16d and/or in the intermediate regions 8686a or 86b are disposed on a geometric straight line that runs at right angles to conveying direction 30. In modifications that are not shown separately, the local injection devices 68 may also be arranged offset from one another based on such a geometric straight line. This is the case, for example, in FIG. 13 for the local injection devices 68 in the intermediate regions 86a, 86b by comparison with the local injection devices 68 on the side walls 16c, 16d. Mutually opposite local injection devices 68 in the intermediate regions 86a, 86b in turn are each present on one such common geometric straight line. Mutually opposite local injection devices 68 on the side walls 16c, 16d are likewise present on such a common geometric straight line, but one different than the geometric straight line based on the local injection devices 68 in the intermediate regions 86a, 86b. The separations of the local injection devices 68 from the support structures 40 may thus be different.

In further modifications that are not shown separately, the vertical injection bars 74 may also have injection nozzles 76 that deliver the respective process gas streams 70 in different directions.

In additional modifications, the local injection devices may be guided through or integrated into the side walls 16c, 16d of the housing 16. In that case too, corresponding injection bars 74 may run vertically or horizontally. Also conceivable are injection walls provided, for example, in the form of ceramic plates or brickwork between the conveying track 32 or the conveying strands 32a, 32b or 32a, 32b, 32c and the heating elements 52. Furthermore, local injection devices 68 may be carried by the application trays 34 or the support frames 44.

In a further variant, the local injection devices 68 may also be designed in such a way that process gas streams 70 are created by controlled, i.e. targeted or aimed suction, by which process gas 66 is sucked toward the support structures 40 and the material 12. For this purpose, for example, it is possible to provide suction tubes that reach close to the conveying track 32 and the support structures 40 or support frames 44 used. It is thus possible for offgases 58 that form at the material 12 to be sucked out directly, giving rise to a reduced pressure there, and for process gas 66 blown into the process chamber 20 elsewhere to flow in in a targeted manner.

Figure 14:
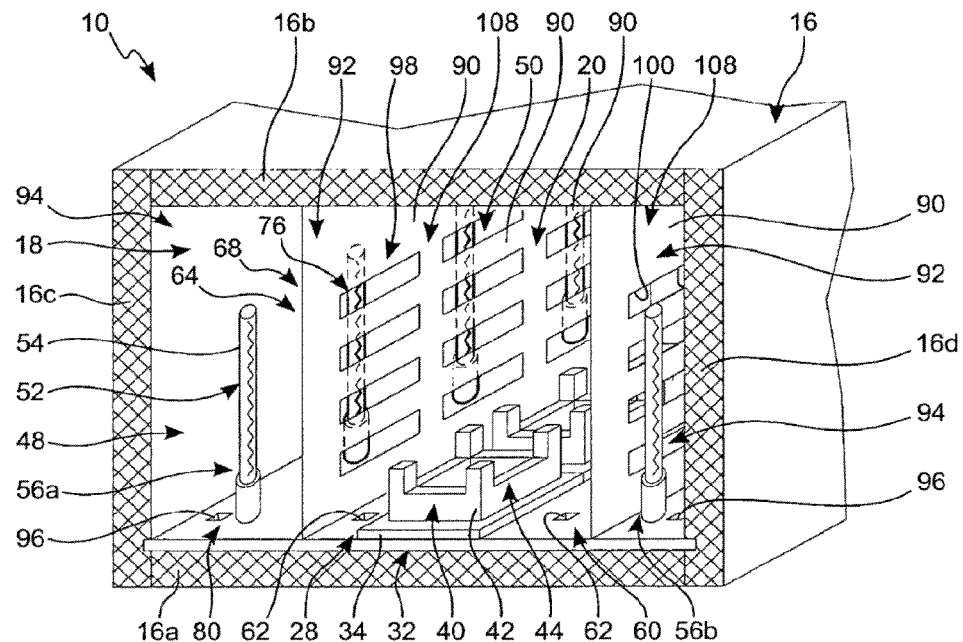
FIG. 14 a perspective cross section of a tunnel kiln in a tenth working example in which another modification of the process gas system comprises multiple local injection devices in the form of vertical injection walls.

FIG. 14 illustrates a tenth working example of a kiln 10, in which the local injection devices 68 of the process gas system 64 are formed by injection wall sections 90 of injection walls 92 that each have multiple injection nozzles 76. The injection walls 92 consist of refractory material.

The injection walls 92 flank the conveying track 32 on both sides and divide the interior 18 into the process chamber 20 and injection chambers 94 that each flank the process chamber 20 and form part of the process gas system 64 and are supplied with process gas 66 via the supply device 80. For this purpose, in the present working example, injection openings 96 are provided in the base of the flow chambers 94.

The injection nozzles 76 in the injection wall sections 90 of the injection walls 92 take the form of passage openings 98. In one modification, the injection nozzles 76 in the injection wall sections 90 may also be provided as separate assemblies that may also be mounted in the injection wall sections 90 in a movable manner. The injection nozzles 76, i.e. the passage openings 98, connect the injection chambers 94 fluidically to the process chamber 20 disposed in between. Also present in the injection chambers 94 are the heating elements 52, such that these also act on the process gas 66 in the flow chambers 94. Process gas 66 then enters the process chamber 20 as a respective process gas stream 70 from each passage opening 98. In a modification, it is also possible for heating elements 52 to be present in the process chamber 20.

The wall material and the wall construction of the injection walls 92 may be selected according to criteria where the thermal energy of the heating elements 52 gets into the process chamber 20 and to the material 12 disposed in the conveying frame 44 substantially without loss or delay.

In the present working example, the passage openings 98 in the injection wall sections 90 take the form of passage slots 100 that run horizontally. The individual passage slots 100 are situated at height levels appropriate for the height levels of the flow passages 46 in the conveying frames 46, such that the process gas streams 70 can efficiently reach the material 12 therein. In FIG. 14, just as in FIGS. 15 and 16, only a single support structure 40 is shown on each application tray 34. Other geometries and alignments of the passage openings 98 are possible.

This kiln 10 works in such a way that the process gas 66 is blown into the injection chambers 94 by the supply device 80, flows through the injection chambers 94 and then enters the process chamber 20 from both sides as process gas stream 70 through the injection nozzles 76 of the injection walls 92, and the process gas streams 70 therein access the material 12 accommodated by the support structures 40 in each case through a flow passage 46 of the conveying frame 44.

As in the case of the injection nozzles 76 elucidated above, the passage openings 98 in the injection walls 92 may also be set up such that the process gas streams 70 are delivered from the local injection devices 68 parallel to a horizontal reference plane or inclined upward or downward relative to such a horizontal reference plane, i.e. the injection wall sections 90 of the injection walls 92 here.

Again, offgas 58 is sucked out of the process chamber 20 through suction openings 62 of the suction system 60 in the base of the process chamber 18.

Figure 15:
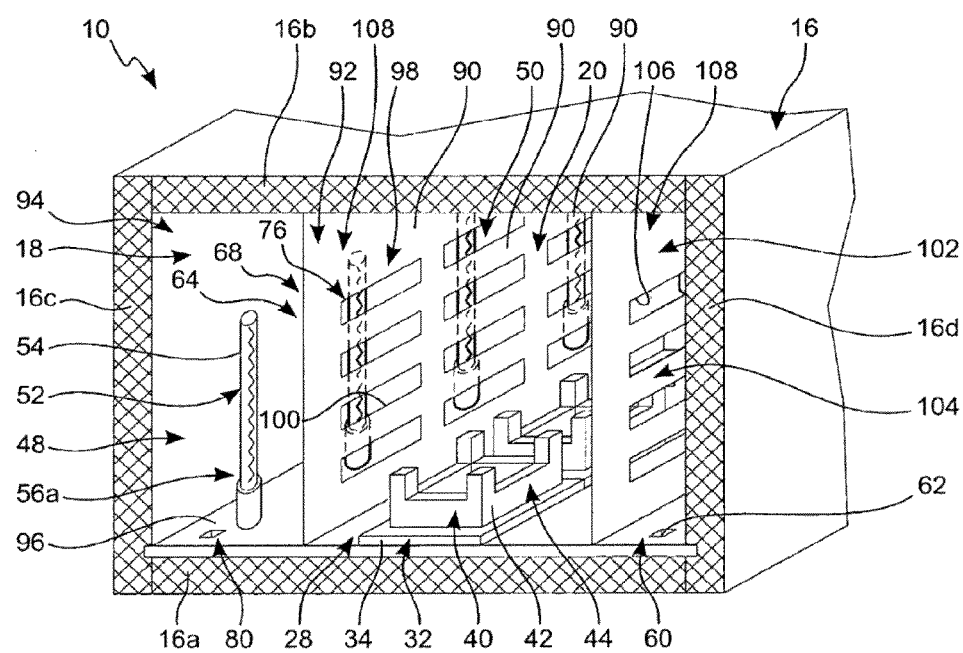
FIG. 15 a perspective cross section of a tunnel kiln in an eleventh working example in which the process gas system comprises an injection wall and a suction system has a suction wall.

FIG. 15 shows a modified eleventh working example in which injection wall sections 90 form an injection wall 92 only on one side of the conveying track 32, as a result of which an injection chamber 94 for process gas 66 is indeed formed on that side only alongside the process chamber 20.

On the opposite side of the conveying track 32 there is a suction wall 102 that separates the process chamber 20 from a suction chamber 104. In the suction chamber 104 are the suction openings 62 of the suction system 60. The suction wall 104 has a multitude of passage openings 106 that fluidically connect the process chamber 20 to the suction chamber 104.

In practice, the injection wall 92 and the suction wall 102 and their passage openings 98 or passage openings 106 are structurally identical. The term "injection wall" or "suction wall" arises from the technical function with respect to the process chamber 20. In general terms, both an injection wall 92 and a suction wall 102 are flow-through walls 108.

As apparent in FIG. 15, heating elements 52 are arranged in a row of heating bars 56a in the injection chamber 94 only. In a modification, heating elements 52 may also be present in the suction chamber 104 and/or in the process chamber 20.

In the kiln 10 shown in FIG. 15, the injection chamber 94 may be fed by means of the supply device 80 with process gas 66 that passes through the injection wall 92 into the process chamber 20, where it flows toward the material 12 or through the conveying frame 44. Offgas 58 and excess process gas 66 flow out of the process chamber 20 through the passage openings 106 in the suction wall 102 into the suction chamber 104, from which they are then drawn off via the suction openings 62.

Corresponding injection walls 92 and/or suction walls 102 may also be present in the working examples according to FIGS. 9 to 13, in each case in conveying direction 30 to the right and left alongside one of the multiple conveying strands 32a, 32b or 32a, 32b and 32c in each case. It is optionally also possible for an injection chamber 94 to be formed in each case between two conveying strands 32a, 32b or 32b, 32c, and a suction chamber 104 on each side alongside the multistrand conveying track 32.

Figure 16:
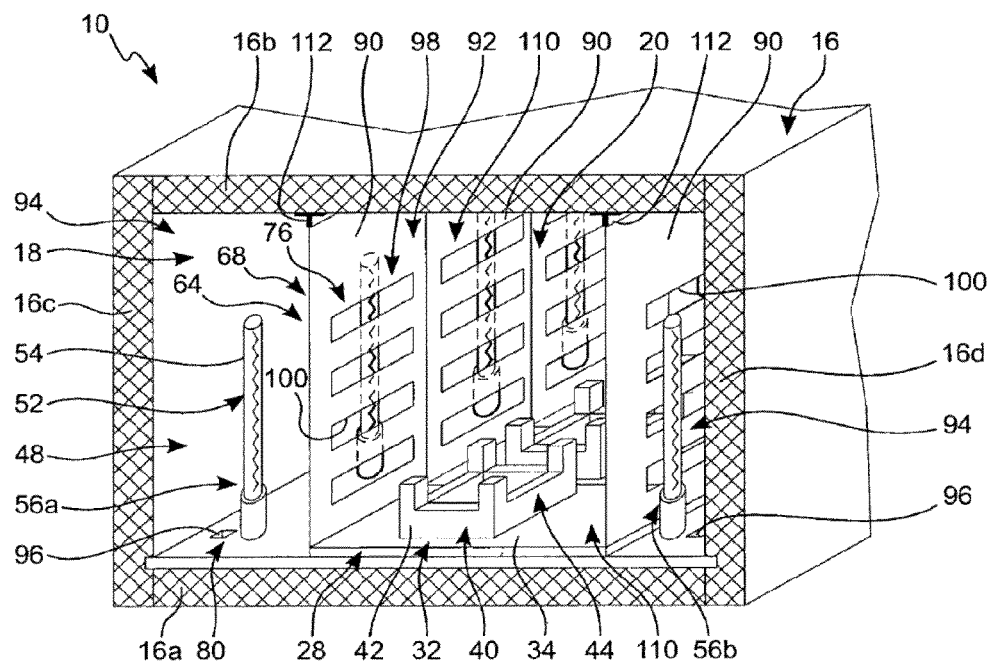
FIG. 16 a perspective cross section of a tunnel kiln in a twelfth working example in which the conveying system comprises multiple process housings having injection walls and/or suction walls.

FIG. 16 illustrates a twelfth working example of a kiln 10. In this kiln 10, the conveying system 28 comprises multiple process housings 110, with which the support structures 40 together with the material 12 are conveyed through the process chamber 20. Such a process housing 110 comprises, in the kiln 10 according to FIG. 16, one of the application trays 34 and two injection wall sections 90 that are carried by the application trays 34. In this case, in a process housing 110, two injection wall sections 90 in each case are secured to the application trays 34 on each side in a direction at right angles to conveying direction 30, such that the injection wall sections 90 move through the process chamber together with the application tray 34. The injection wall sections 90 are guided along the roof 16b, for which purpose they run in guide rails 112 there.

The term "housing" in the case of the process housings 110 does not mean that they are closed. In the present working example, they are open, for example, at least at the end faces that point in or counter to conveying direction 30.

When a plurality of such process housings 110 are arranged in succession in the process chamber 20, their injection wall sections 90 in conveying direction 30 each form an injection wall 92, and there are again two injection chambers 94 on each side of the conveying track. 32. The suction openings 62 of the suction system 60 are provided in the process chamber 20 on the roof 16b of the housing 16 and are therefore not apparent in FIG. 16.

With respect to one or more support structures 40 disposed on a particular application tray 34 of a process housing 110, the injection wall sections 90 are thus in a stationary arrangement.

In this way, the passage openings 98 are thus always in the same position and orientation relative to the support structures 40 or relative to the flow passages 46 when multiple support structures 40 are stacked one on top of another on the application tray 34. Thus, the material 12 in any position of the support structures 40 in the process chamber 20 can always be contacted with process gas 66 to the same reproducible degree.

By contrast, in the working examples according to FIGS. 14 and 15, the situation arises that the support structures 40 in conveying direction 30 are in regions between two adjacent passage openings 98, such that, in these conveying situations, less process gas 66 gets to the material 12 than in the conveying situations in which the support structures 40 are alongside the passage openings 106.

The process housing 110 originally forms part of the transport system 28, but also includes components in the form of the injection wall sections 90 that are assigned to the process gas system 64.

In a modification, a process housing 110 may have just one injection wall section 90 of an injection wall 92, while, on the opposite side, a corresponding injection wall section of a suction wall 102 that is then formed overall is present. In this case, process gas 66 flows through the process housing 110, and offgas 58 is sucked out through the suction wall 102. In this case, the process housing 110 also includes components that are assigned to the suction system 60.

Figure 17:
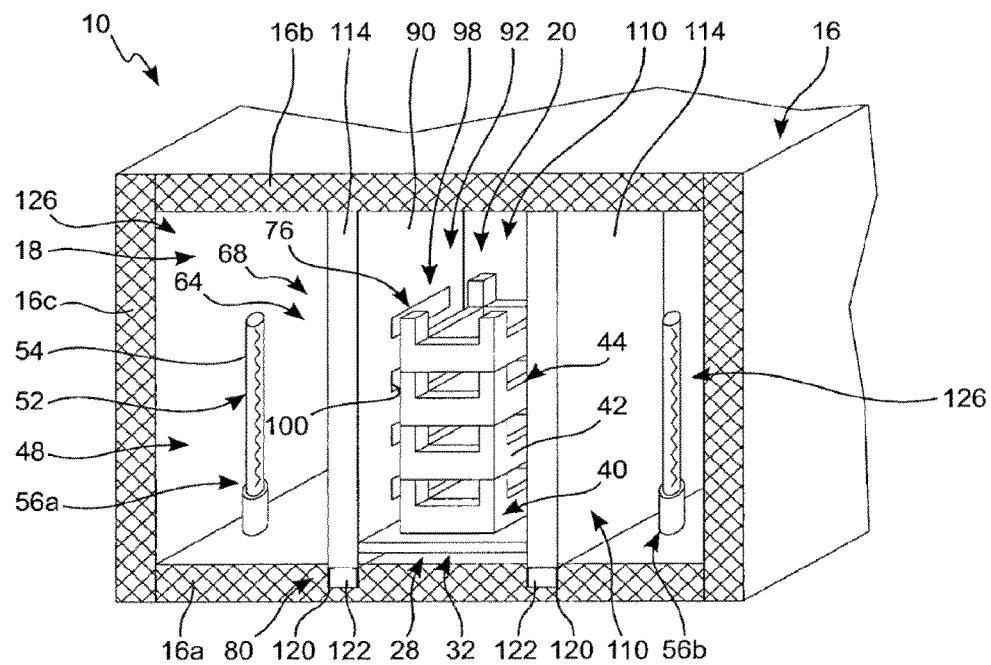
FIG. 17 a perspective cross section of a tunnel kiln in a thirteenth working example in which the conveying system comprises modified process housings.
Figure 18:
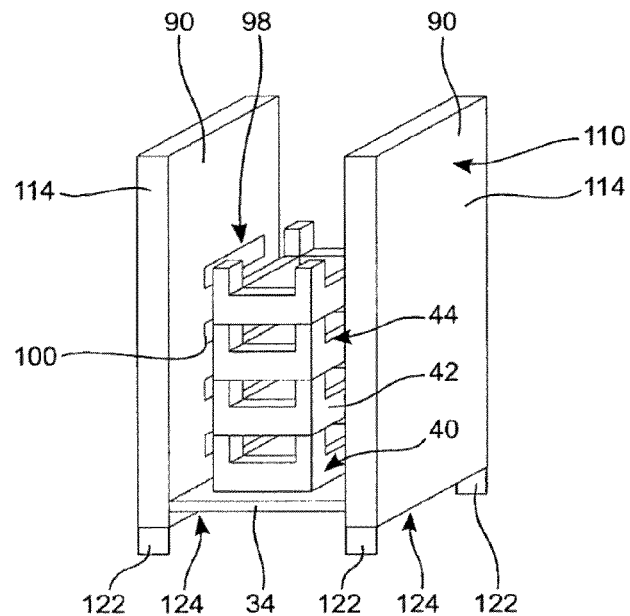
FIG. 18 a perspective view of a process housing according to FIG. 17.

FIG. 17 shows, as a thirteenth working example, a kiln 10 in which the injection wall sections 90 of the injection wall 92 of the process housing 110 take the form of a hollow wall 114 having a wall interior 116 which is fluidically connected to the process chamber 20 via the passage openings 98. The hollow walls 114 have a passage 118 in each case on their lower narrow flanks, through which process gas 66 can flow into the wall interior 116. The two hollow walls 114 in this case serve as injection wall 92.

For this purpose, the process gas system 64 comprises, at the base 16a of the housing 16, for each hollow wall 114, a channel 120 with U-shaped cross section, on the upper edges of which the hollow walls 114 lie in a slidable manner. The hollow walls 114 have, to the front and back in conveying direction 30, sealing tongues 122 that project downward into the respective channel 120 and are conform to the cross section of the channel 120 in a complementary manner. In conveying direction 30 between these sealing tongues 122, a movable entrance chamber 124 for the process gas is then formed in the channel 120, and this moves together with the process housing 110. The sealing tongues 122 do not hermetically seal these entrance chambers 124; instead, a gap remains between the edges of the sealing tongues 122 and the feed channel 120. However, this is sufficient to build up a positive pressure by virtue of process gas 66 flowing into the entrance chamber 124, such that process gas 66 then flows out of the entrance chamber 124 through the passage 118 into the wall interior 116 of the hollow wall 114 and thence passes through the passage openings 98 into the process chamber 20 and to the material 12 in the support structures 40.

The channels 120 have, in conveying direction 30, openings at regular intervals that are not apparent in the figures. These openings in the channels 120 are arranged in conveying direction 30 at a distance at which it is ensured that a moving entrance chamber 124 always covers at least one opening when the process housing 110 is being conveyed through the process chamber 20. Through these openings, process gas 66 can be blown into the feed channels 120, and this then flows into the hollow wall 114 through the moving entrance chamber 124.

When multiple process housings 110 with the hollow walls 114 in succession are disposed in the process chamber 20, the process chamber 20 is flanked by heating chambers 126 in which the heating elements 52 are disposed. The hollow walls 120 are constructed such that the thermal energy from the heating elements 52 gets into the process chamber 20 and to the material 12 disposed in the conveying frame 44 substantially without loss or delay. Alternatively, the process gas 66 only may ensure the necessary temperature in the process chamber 20, for which purpose the process gas 66 is blown into the feed channels 120 in correspondingly conditioned and heated form.

The suction system 60 in the working example described here sucks offgas 58 out again via suction openings 62 disposed in the region of the process chamber 18 in the roof 16b of the housing 16.

In one variant, it is alternatively possible for just one of the two hollow walls 114 to serve as injection wall 92, while the other hollow wall 114 is designed as suction wall 102. In this case, rather than process gas 66 being blown in via the openings of the channel 120 that forms part of this suction wall 102, offgas 58 and excess process gas 66 are instead sucked out.

In further modifications that are not shown separately here, the hollow walls 114 may also have passages on the top side that correspond to the passages 118, in which case channels complementary to the hollow walls 114 are present on the roof 16b of the housing 16, these corresponding to the channels 120 and having appropriate openings that serve to blow in process gas 66 or suck out offgas 58. In a corresponding manner, the hollow walls 114 then have sealing tongues that project upward.

In the case of a conveying system 28 having multiple conveying strands 32a, 32b or 32a, 32b, 32c, it is possible for hollow walls 114 to be present between two support structures 40. As the case may be, such a middle hollow wall 114 then has passage openings 98 on both sides, or two hollow walls 114, the passage openings 98 of which point in opposite directions, are arranged alongside one another.

Figure 19:
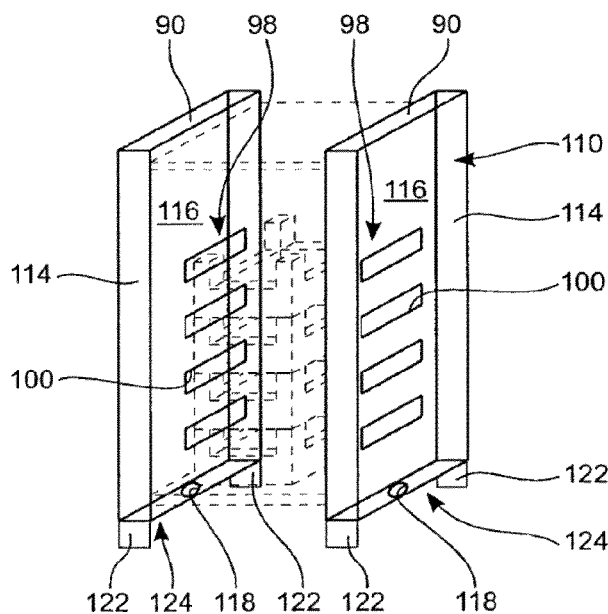
FIG. 19 a perspective view of a process housing according to FIG. 17 in partly transparent form.

Optionally, the process housing 110 may have a roof at the top, indicated by dotted lines in FIG. 19.

What is claimed is:

1. An apparatus for thermal or thermochemical treatment of material, comprising
   a) a housing;
   b) a process chamber within the housing;
   c) a conveying system, by means of which the material or support structures laden with the material can be conveyed in a conveying direction into or through the process chamber;
   d) a heating system, by means of which a process chamber atmosphere present in the process chamber can be heated up;
   e) a process gas system, by means of which the process chamber can be supplied with a process gas required for the thermal treatment of the material,
   wherein
   f) the process gas system comprises multiple local injection devices arranged and set up such that process gas in multiple local process gas streams each with a main flow direction can be delivered targeted onto the material or onto the support structures laden with material, and
   wherein
   g) at least one local injection device includes multiple injection nozzles set up in such a way that multiple process gas streams can be delivered at different angles relative to each other and relative to the conveying direction and a horizontal reference plane.

2. The apparatus as claimed in claim 1, wherein at least one of the local injection devices comprises multiple injection nozzles.

3. The apparatus as claimed in claim 2, wherein at least one of the injection nozzles is movable by motor or manually, such that the main flow direction of the process gas stream generated by this injection nozzle is adjustable.

4. The apparatus as claimed in claim 1, wherein at least one local injection device takes the form of an injection tube.

5. The apparatus as claimed in claim 4, wherein the injection tube runs horizontally or vertically.

6. The apparatus as claimed in claim 1, wherein at least one local injection device is secured to the base or to the roof of the housing.

7. The apparatus as claimed in claim 1, wherein at least one local injection device is an injection wall section of an injection wall that divides an interior of the housing into the process chamber and an injection chamber that can be supplied with process gas.

8. The apparatus as claimed in claim 7, wherein the injection wall section has multiple passage openings, especially passage slots, that fluidically connect the process chamber to the injection chamber.

9. The apparatus as claimed in claim 7, wherein the conveying system comprises at least one process housing on which the material or support structures laden with the material can be conveyed in the conveying direction into or through the process chamber, wherein the process housing comprises at least one injection wall section.

10. The apparatus as claimed in claim 9, wherein the injection wall section of the process housing takes the form of a hollow wall with a wall interior that can be supplied with process gas.

11. The apparatus as claimed in claim 1, wherein the conveying system comprises at least one support structure for the material.

12. The apparatus as claimed in claim 11, wherein multiple support structures form a conveying frame having flow passages which keep a respective interior of the support structures accommodating the material connected to the environment for flow purposes.

13. The apparatus as claimed in claim 12, wherein the local injection devices are set up and adjusted such that at least some of the process gas streams flow through one or more flow passages.

14. The apparatus as claimed in claim 1, wherein the conveying system has a conveying track or multiple conveying strands along which the support structures are conveyed, and in that local injection devices of the process gas system and/or heating elements of the heating system are disposed on one or both sides of the conveying track or at least one conveying strand.

15. The apparatus as claimed in claim 14, wherein two adjacent conveying strands are spaced apart from one another, so as to form an intermediate region there in which heating elements of the heating system and/or one or more local injection devices are disposed.

16. The apparatus as claimed in claim 1, wherein the heating system comprises heating elements in the form of vertical heating bars.

17. The apparatus as claimed in claim 1, wherein the process gas system is set up such that various local injection devices can be fed with different kinds of process gas.

\* \* \* \* \*